3,342,656
METHOD OF SPLICING BELT ENDS IN FORMING AN ENDLESS BELT

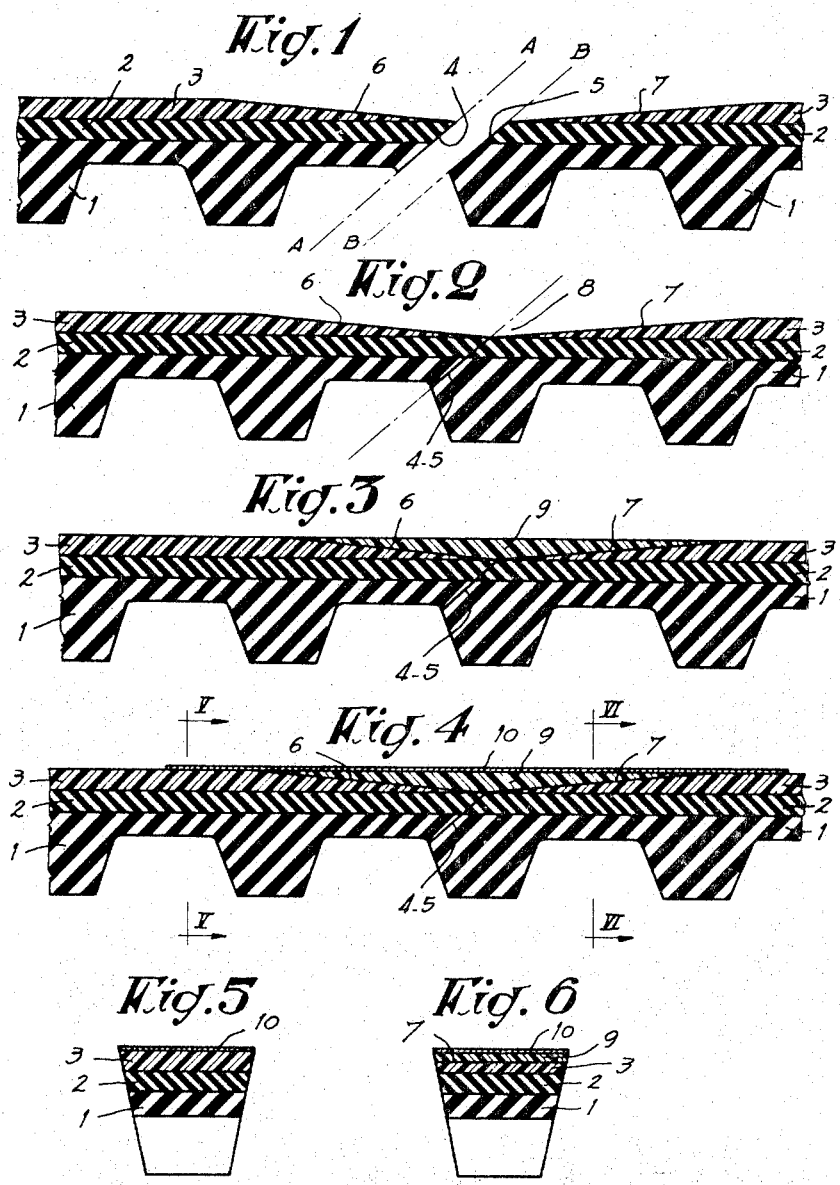

Démètre Papageorges, Liege, Belgium, assignor to Etablissements Theodore Houben Société Anonyme, Verviers, Belgium, a Belgian company
Filed Dec. 16, 1963, Ser. No. 330,765
Claims priority, application Belgium, Dec. 17, 1962, 626,218; Dec. 3, 1963, 640,726
3 Claims. (Cl. 156—159)

The present invention in concerned with the splicing of two belt ends, either for the preparation of an endless belt from stock or reels, or for the repair of belts. This process is more specially applicable to that sort of belt which comprises an outer hand, forming the external periphery, made of synthetic matter and more particularly of a synthetic fiber-forming polymer, bonded to a continuous band of dented or notched elastic material, generally natural or synthetic rubber.

The essential purpose of this method is to obtain a splice which is such, that even in the case of belts with relatively very small thickness and, by merely creating a practically negligible oversize thickness, a splice is obtained which has the threefold advantage of an exceptional tensile strength, of an almost inexistent variation in the transverse dimensions of aforesaid external periphery and also of a combination between the superposed elements in such a way, that the particular characteristics of the belt remain practically constant over its entire length, i.e. also at the location of aforesaid splice.

The essential characteristics of the latter are to be found in the coordination of the following means:

(a) The oblique orientation of the contact surfaces of the elastic mass of the belt;

(b) The elongated tapered shape of the adjacent ends of the outer periphery which, at the actual location of the splice, form a depression of general triangular shape, the height of the triangle being roughly equal to the thickness of aforesaid outer layer and the base being of a very considerable length with respect to this height;

(c) The filling up of aforesaid depression by an elastic mass, and finally, (d) The covering up of all the constituent parts of the splice with a thin layer of resilient material having an adequate resistance.

In the case of flat belts made up by superposition of a layer of leather and a layer of some product of polycondensation, the method has been suggested of cutting the ends to be joined to a tapered shape in such a way that the contact surfaces are slanting, and of covering up the splicing area with a thin band of polycondensation product.

Such a method does not give satisfaction due to the fact that the contact surface between the ends to be joined is relatively small, as its length is determined by the length of the ends which have been tapered.

On the other hand, if the technique according to the British patent had to be extended to the splicing of rubber belts, with an outer layer of polyamide for instance, the result would be that the contact surface between adjacent ends of polyamide would be infinitesimal and nonefficient, whilst in the case of the new type of splice, revealed in the present description, that surface is relatively of considerable importance.

In order to be able to give greater emphasis to the characteristics of this new splicing technique, its application to a complex belt has been described in greater detail, without the slightest character of limitation, and with reference to the appended drawings in which:

FIGURES 1, 2, 3 and 4 show four successive phases of the method as applied to the splicing of two ends of dented or notched V belts;

FIGURES 5 and 6 respectively show cross-sections according to lines V—V and VI—VI of FIGURE 4.

The figures are concerned with a dented or notched V belt made up of two layers 1-2 of rubber with different characteristics, of an outer layer 3 of synthetic fibre-forming polymer, such as for instance a polyamide or a polyester resin.

The first phase (FIGURE 1) consists of the preparation of the ends to be joined by slicing them according to similarly inclined planes A—A and B—B in such a manner that their respective contact surfaces 4-5 be identical in dimensions and in orientation; the extremities of the outer layer 3 are cut or ground to a tapered shape so as to offer two long inclined surfaces, respectively 6-7.

The second phase (FIGURE 2) consists in approaching to each other both ends prepared in this manner in such a way that surface 4 of the one exactly fits over surface 5 of the other, an appropriate bonding compound having been applied between them, preferably composed of some resin which can be polymerized; this also results in the formation, at the outer layer of the belt, of a depression 8 of general triangular shape.

The third phase (FIGURE 3) consists in filling up the depression created by the end to end location of the two inclined surfaces 6-7 of the outer layer of the belt with a plastic material, preferably a synthetic fibre-forming polymer, and preferably a polyamide or a polyester resin.

For this purpose one could make use of a portion of a strip 9 of such a material, the ends of which have been tapered so that its longitudinal cross-section assumes a triangular shape as nearly equal as possible to that of aforesaid triangular depression.

The fourth phase (FIGURE 4) consists in covering up outer layer 3 of the belt over a greater length than of strip 9, by a self-adhesive tape 10 which is generally well known.

Finally, according to the materials used, a final phase could consist of heating under pressure of all the parts adjacent to the splice thus formed, so as to cause, by polymerisation, a perfect weld between the various elements.

The same method can indeed be applied, irrespective almost of the cross-section and the dimensions of the belt.

The various material specified in the course of the example described could very well be replaced by any equivalent or appropriate materials, and the constitution of the belt itself is essentially variable.

The present invention is concerned with the method of which the essential phases have been described above, as well as with any continuous belt, dented or notched, which has been subjected to such a splice, either for the fabrication of endless belts from strips off a reel, or for constituting endless belts on the spot, or finally for repair purposes.

What I claim is:

1. Method for the splicing of belts, made more particularly of rubber, the external surface of which consists of a layer of fibre-forming polymer selected from the class consisting of a polyamide and polyester resin, characterized by the fact that it consists in cutting the two ends to be joined in such a manner as to obtain two identical surfaces with a similar slant, trimming both ends of the outer layer in such a way as to form two relatively long inclined surfaces thus forming a depression of triangular shape, filling up aforesaid depression with a material similar to that of the outer circumference, covering the splice thus formed with a thin strip of self-adhesive synthetic material and polymerizing the splice by the effects of pressure and heat.

2. Method according to claim 1, characterized by the fact that said filling material of the depression occurring in the outer circumference of the belt, at the location of the splice, consists of a strip of synthetic material, of the same nature as that of the outer circumference, aforesaid strip having previously been trimmed towards both its ends in such a way that its shape and dimensions approximately correspond to those of aforesaid depression.

3. Method according to claim 1, characterized by the fact that the self-adhering strip covering the external surface of the splice is also made of a material of the same nature as that of the outer circumference of the belt and of the covering strip used for joining the ends of aforesaid outer circumference.

References Cited

UNITED STATES PATENTS

| | | | |
|---|---|---|---|
| 756,220 | 4/1904 | Elstun | 24—38 |
| 2,412,693 | 12/1946 | Pierson | 156—157 |
| 2,751,321 | 6/1956 | Sans | 156—157 |
| 3,031,364 | 4/1962 | Perkins | 156—304 X |
| 3,053,724 | 9/1962 | Galloway | 156—304 X |
| 3,100,659 | 8/1963 | Rittenhouse | 156—159 X |

EARL M. BERGERT, *Primary Examiner.*

P. R. WYLIE, P. DIER, *Assistant Examiners.*